(No Model.)
V. T. SWEENEY.
WAGON BRAKE.
No. 528,826.  Patented Nov. 6, 1894.
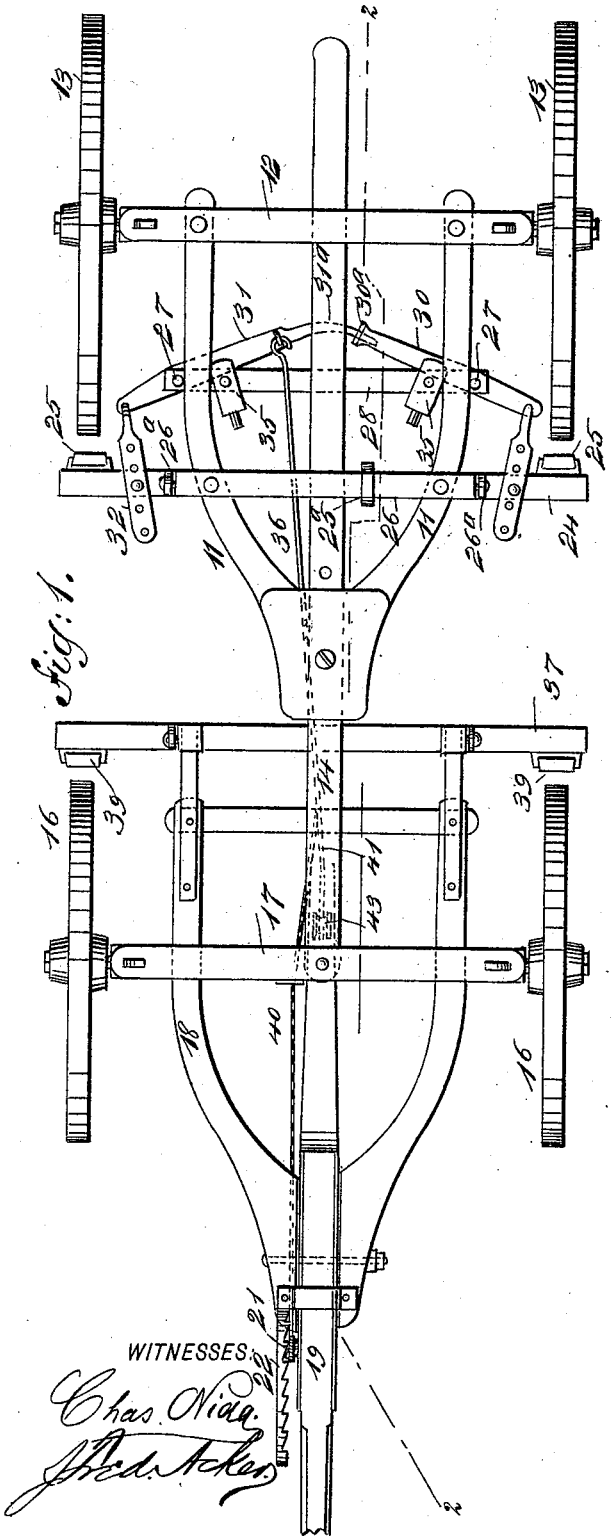
WITNESSES
Chas. Nida.
J. Fred Acker
INVENTOR
V. T. Sweeney
BY
Munn & Co.
ATTORNEYS.

(No Model.) 2 Sheets—Sheet 2.
V. T. SWEENEY.
WAGON BRAKE.
No. 528,826. Patented Nov. 6, 1894.
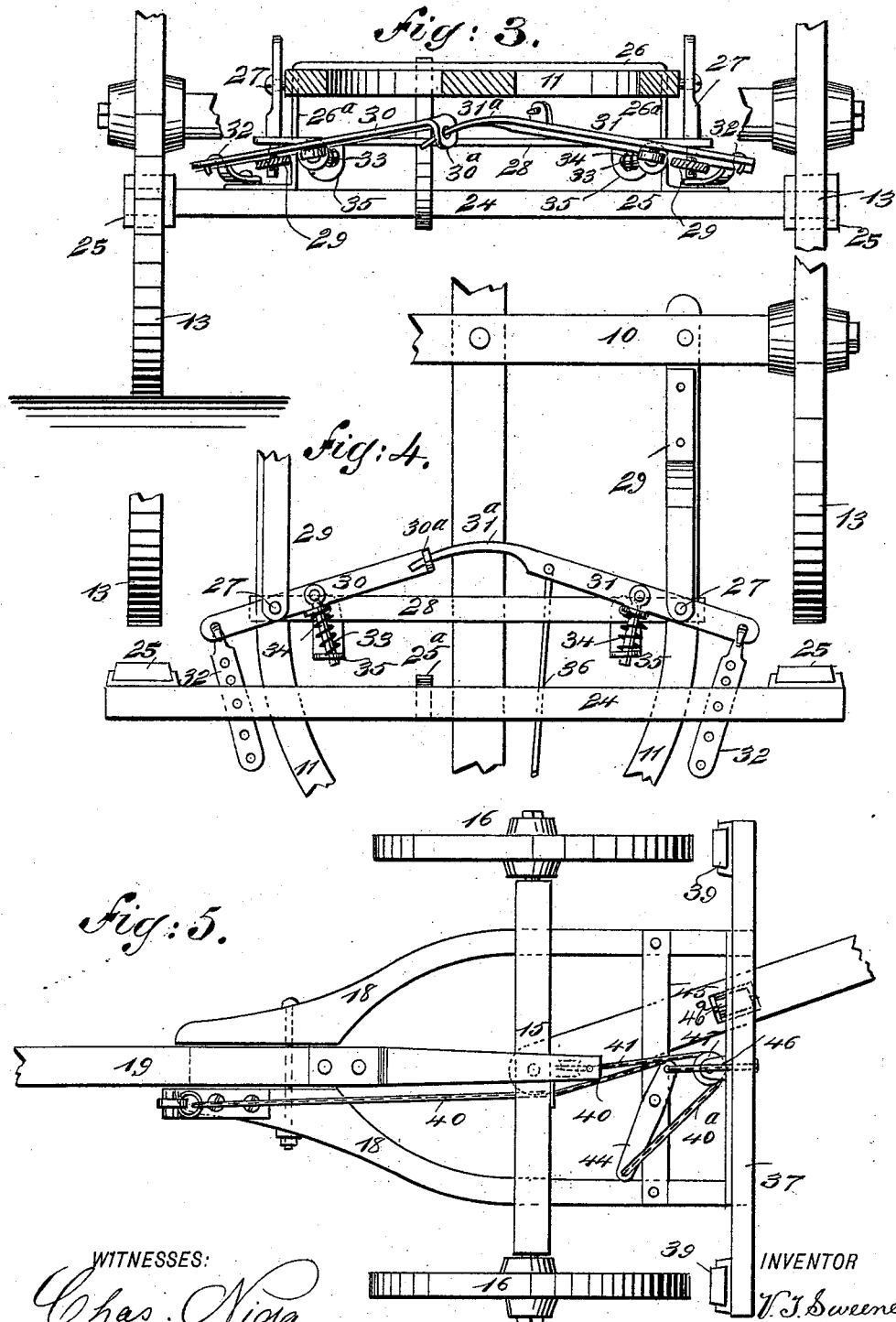
WITNESSES:
INVENTOR
V. T. Sweeney
BY
Munn & Co.
ATTORNEYS.

United States Patent Office.

VARDIMAN TAYLOR SWEENEY, OF SPRINGFIELD, KENTUCKY.

WAGON-BRAKE.

SPECIFICATION forming part of Letters Patent No. 528,826, dated November 6, 1894.

Application filed June 29, 1894. Serial No. 516,114. (No model.)

*To all whom it may concern:*

Be it known that I, VARDIMAN TAYLOR SWEENEY, of Springfield, in the county of Washington and State of Kentucky, have invented a new and Improved Wagon-Brake, of which the following is a full, clear, and exact description.

My invention relates to an improvement in wagon brakes, and to an improvement upon the construction of brakes for which Letters Patent were granted to me October 18, 1892, No. 484,687, the object of the invention being to simplify such construction, and to provide a durable, economic and simple arrangement whereby brakes may be expeditiously and conveniently applied to both the forward and rear wheels of the vehicle, either by backing the team, or by means of a lever or its equivalent.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the running gear of a vehicle having the improvement applied thereto. Fig. 2 is a longitudinal vertical section taken practically on the line 2—2 of Fig. 1. Fig. 3 is a section through the rear hounds, taken essentially on the line 3—3 of Fig. 2, illustrating the rear wheels and the rear brake mechanism in rear elevation. Fig. 4 is a bottom plan view of the rear brake mechanism; and Fig. 5 is a bottom plan view of the forward hounds, illustrating a modified form of applying the brakes through the lever or pole of the vehicle.

The rear axle 10 is provided with the usual rear hounds 11, bolsters 12 and ground wheels 13, the rear axle being connected by a reach 14 with the forward axle 15, which is provided with the usual forward wheels 16 and bolsters 17, together with the forward hounds 18. The pole 19 has sliding movement in the forward hounds, being provided to that end with a longitudinal slot 20 and a pin which passes through said slot and through the hounds, as shown in Fig. 2. A lever 21, is likewise pivoted preferably to the forward end of the forward hounds, adapted for engagement with a rack 22, whereby the lever may be held in a predetermined position, and the pole is provided with an extension 23, which extends beneath and rearwardly beyond the forward axle, as illustrated in Fig. 2.

The brake bar 24, adapted for use in connection with the rear wheels, is provided with any approved form of brake shoes 25, and is pivotally connected with an upper cross bar 26, extending over and attached to the rear hounds, the connection with the brake bar being effected through the medium of links $26^a$; and the brake bar is held normally in advance of the rear wheels, or with its brake shoes out of contact with said wheels, by means of a spring $25^a$, usually attached to the cross bar 26 and having bearing ordinarily against the rear face of the brake bar, as shown in Fig. 2.

Posts 27, are extended downward from the sides of the rear hounds 11, rearward of the said cross bar 26, and the said posts are adapted to support in a horizontal position beneath the said rear hounds a cross bar 28, and brackets 29 are carried preferably from the rear axle 10 to a connection with the lower extremities of the posts, which extremities pass through the said cross bar 28, as illustrated in Fig. 3.

Two levers 30 and 31 are employed to manipulate the rear brake bar 24. These levers are pivoted between their centers and outer ends, one upon each of the posts 27 between the brackets 29 and the cross bar 28. The inner end of the lever 30 is provided with a socket $30^a$, as shown in Figs. 3 and 4, adapted to receive the inner end $31^a$ of the opposing lever 31, the said end being reduced in diameter, and it is preferably made more or less round in cross section and forwardly curved, so that normally the two levers will stand at an angle to one another, their outer ends facing forwardly. The levers are held in this position through the medium of studs 33, which are projected one forwardly from each lever, the studs being usually encircled by springs 34, the forward or free end of the studs being made to pass through apertures in brackets 35, preferably secured to the cross bar 28, the said brackets serving the dual purpose of guides for the studs and bearings for the outer ends of the springs, as is clearly shown in Figs. 3 and 4.

The outer or shorter end of each lever 30 and 31, is adjustably secured to the rear brake bar 24 through the medium of links 32. A connecting rod 36, is attached to one of the levers, preferably to the lever 31; and this rod or bar is preferably made, as shown in Fig. 2 and as described in the former patent, in two sections adjustably connected; and the forward end of the connecting bar 36, is secured ordinarily to the central portion of a brake bar 37 for the forward wheels, the attachment being ordinarily accomplished through the medium of a cable 38, secured to the connecting bar and detachably attached to the brake bar, the said forward brake bar being pivotally connected with or hung from the forward hounds 18, and it is provided with a brake shoe 39 at or near each end.

The cable 38 has spliced or otherwise attached thereto two cables 40 and 41, or both of these cables may be, and sometimes are attached directly to the forward end of the connecting bar 36. One of the cables 40, is carried forwardly through suitable guides, and is preferably attached to the lower end of the lever 21 located upon the forward hounds, and by drawing the said lever rearward at its free end the cable 40 will be carried forward, carrying in the same direction the forward brake bar 37 and applying the shoes thereof to the forward wheels, while through the short cable 38 the connecting bar 36 will likewise be drawn in a forward direction, causing the two rear brake levers 30 and 31 to be carried forwardly at their inner ends against the tension of their controlling springs, and in this manner the rear brake bar will be drawn to the rear wheels and the shoes applied thereto.

The moment that the forward lever 21 is released, the springs controlling the rear brake levers will restore them to their normal position, and acting in conjunction with the spring 25ª bearing upon the rear brake bar, will force said bar to its normal position; and it may here be remarked that a similar spring 42, has bearing against the front brake bar, normally holding it in a rearward direction, which latter spring will also operate the moment the cable 40 is loosened or permitted to move rearwardly.

The cable 41 also attached to the forward brake bar or the connecting bar 36, is carried over a friction roller or pulley 43, usually located upon the inner face of the forward axle, and is then secured to the rear end of the pole extension 23. It will thus be seen that when the brakes are to be applied by backing the team, the pole is itself carried rearward and will draw forwardly, through the cable 41, both upon the forward brake bar and the actuating mechanism connected with the rear brake bar.

In Fig. 5 I have illustrated a slight modification in the manner of operating the cables 40 and 41. In this construction a lever 44, is pivoted at one side of its center upon a cross bar 45, located upon the under face of the hounds 18, the shorter end of the lever being its inner end, and this lever is connected by a cable 46 with the forward brake bar, and likewise with the connecting bar 36. The two cables 40 and 41, are merged into one, and the single cable thus formed, and which may be called 40ª, is passed over a friction pulley 47, located for example upon the inner face of a cross bar located at the rear of the forward hounds, and is then attached to the outer or the longer end of the lever 44, the cable 41 being attached to the extension 23 of the pole, while the cable 40, is carried to an engagement with the forward lever 21. The action in applying the brake in this construction is identical with that heretofore set forth.

The reach is provided with a friction roller 46ª adapted to travel upon the slide of the forward hounds to prevent these parts from injuring one another.

Having thus described my invention, I claim as new and desire to secure by Letters Patent—

1. The combination, with the running gear of a vehicle, a pole or tongue having sliding movement in the running gear, and brake bars adapted for braking engagement one with the front and the other with the rear wheels, of spring-controlled levers connected with the rear brake bar and capable when forwardly actuated of carrying the said bar rearwardly, an actuating connection between the said rear brake levers and the forward brake bar, an actuating lever fulcrumed upon the running gear, and a connection between the said lever, the forward brake bar and the rear brake mechanism, substantially as described, whereby the two brake bars will be simultaneously applied upon the manipulation of the actuating lever, as and for the purpose set forth.

2. The combination, with the running gear of a vehicle, a pole or tongue sliding in said running gear, a main brake lever fulcrumed upon the running gear, and a forward and a rear brake bar carried by the running gear, of spring-controlled levers fulcrumed at the rear of the running gear, having sliding connection at their inner ends and connected at their outer ends with the rear brake bar, a connecting bar uniting one of the levers with the forward brake bar, and a draft connection between the connecting bar attached to the rear brake mechanism, the forward brake bar and the main brake lever, as and for the purpose set forth.

3. The combination, with the running gear of a vehicle, a tongue or pole held to slide therein, a main brake lever fulcrumed upon the running gear, and brake bars carried by the running gear and adapted one for engagement with the rear and the other with the forward wheels of the vehicle, of spring-controlled levers fulcrumed upon the running gear at the rear thereof, the inner ends of the said levers having guided movement one over the other, the said levers being normally in arched position, the outer ends of the levers being connected with the rear brake bar, a connecting rod uniting one of said levers with the forward brake bar, a cable connected with the forward brake bar and the said connecting rod and the main brake lever, an extension rearwardly projected from the tongue or pole, and a second cable connected with the said connecting bar, the forward brake bar and the extension of the pole, the said second cable being passed over a friction or guide pulley, as and for the purpose specified.

VARDIMAN TAYLOR SWEENEY.

Witnesses:
R. T. COCANAUGHER,
ROBT. S. WARNER.